(12) United States Patent
Vilato et al.

(10) Patent No.: US 6,399,183 B1
(45) Date of Patent: *Jun. 4, 2002

(54) PLATE MADE OF GLASS MATERIAL

(75) Inventors: Pablo Vilato, Paris; Michel Grassi, La Ferte Sous Jouarre; Jean-Francois Mikoda, Nointel, all of (FR)

(73) Assignee: Eurokera, Chateau-Thierry (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,920

(22) Filed: Oct. 29, 1998

(30) Foreign Application Priority Data

Oct. 29, 1997 (FR) .............................. 97 13552

(51) Int. Cl.⁷ .............................. B32B 23/02
(52) U.S. Cl. .............. 428/192; 428/121; 428/195; 428/210; 428/447
(58) Field of Search .............. 428/76, 447, 121, 428/210, 192, 195; 49/490, 491; 296/84.1, 93, 95.1

(56) References Cited

U.S. PATENT DOCUMENTS

| | | | | |
|---|---|---|---|---|
| 4,453,533 A | * | 6/1984 | Scheidler et al. ............ | 126/211 |
| 4,492,217 A | * | 1/1985 | Scheidler .................. | 126/39 B |
| 4,854,636 A | * | 8/1989 | Greenhalgh et al. ......... | 296/201 |
| 4,993,774 A | * | 2/1991 | Greenhalgh et al. ......... | 296/201 |
| 5,057,265 A | * | 10/1991 | Kunert et al. .............. | 264/511 |
| 5,185,047 A | * | 2/1993 | Ray ........................ | 156/242 |
| 5,316,829 A | * | 5/1994 | Cordes et al. .............. | 428/192 |
| 5,384,995 A | | 1/1995 | Kunert et al. .............. | 52/394 |
| 5,584,957 A | | 12/1996 | Schultheis et al. .......... | 156/289 |
| 5,723,196 A | | 3/1998 | Cornils et al. ............. | 428/122 |

FOREIGN PATENT DOCUMENTS

| | | | |
|---|---|---|---|
| EP | 0 081 426 | 6/1983 | |
| EP | 0 421 833 | 4/1991 | |
| EP | 0 620 134 | 10/1994 | |
| EP | 0 639 538 | 2/1995 | |
| FR | 2 744 201 | 8/1997 | |
| JP | 04 261 822 | * 9/1992 | ............ B29C/47/02 |

OTHER PUBLICATIONS

English transilation of foreign patent number JP 04 261 822 translated by Schreiber Traslation Inc., 1996.*

* cited by examiner

Primary Examiner—Bruce H. Hess
Assistant Examiner—B. Shewareged
(74) Attorney, Agent, or Firm—Oblon, Spivak, McClelland, Maier & Neustadt, P.C.

(57) ABSTRACT

The invention targets a plate made of glass material such as tempered glass or glass-ceramic designed to be mounted in a frame, comprising at least one polymer strip on its periphery, said strip having on at least one part of its length a shape that allows the plate to be mounted, for example by nesting with the frame.

13 Claims, 3 Drawing Sheets

PLATE MADE OF GLASS MATERIAL

BACKGROUND OF THE INVENTION

1. Field of the Invention

The invention relates to plates made of glass material, more particularly designed to equip ranges, such as tempered glass plates or glass-ceramic plates. Such plates made of tempered glass are used more particularly to form the tops of gas ranges, the burners being able to pass through said tempered glass plates. Glass-ceramic plates am designed more particularly to cover heating elements.

While not limited to such applications, the invention will be described more specifically in reference to glass-ceramic plates that make up the top portion of ranges. These types of ranges comprise heating elements such as radiant or halogen heating units and control mechanisms to vary their intensities.

2. Description of the Related Art

These various elements are placed in a structure, usually a metal structure, and covered with a glass-ceramic plate, which closes the structure. Assembly of these cooking surfaces is therefore completed by placing the glass-ceramic plate onto the metal structure. This manufacturing step is accomplished by adhesive bonding using a silicone adhesive, which is suited to this type of use. Indeed, the silicone adhesive performs various types of functions. First of all, it makes it possible to keep the glass-ceramic plate on the structure in a specific position; a range manufactured in this way can be transported easily, since all the elements are attached to one another. Another function of the silicone adhesive is to ensure that the enclosure formed by the metal structure and the glass-ceramic plate remains leak-proof. This enclosure must first have good tightness so that in the event something boils over, water does not get inside and risk causing a short-circuit. Secondly, from a hygienic standpoint, since this type of plate is a tool for preparing food, it is necessary to prevent areas that are difficult to access and impossible to clean from getting dirty in order to avoid germ growth.

Another function of the silicone adhesive is to absorb mechanical impacts: on the one hand, it prevents any direct contact between the metal structure and the glass-ceramic plate, and, on the other hand, it can compensate for the thermal expansion of the metal structure since the glass-ceramic plate has virtually no expansion coefficient. One feature of silicone adhesives is that they have good temperature resistance. Although the silicone adhesive is only used on the periphery of the glass-ceramic plate and therefore at some distance from the heating areas, this temperature resistance is important: first of all the periphery of the glass-ceramic plate nevertheless experiences a rise in temperature when one or more heating units are in operation. Furthermore, a heated item such as a saucepan can be placed on the edge of the plate and thus quickly subject the adhesive to a high temperature.

A final function of the silicone adhesive for certain assemblies is aesthetic in nature: since at least some of the adhesive is applied on top, it is important to be able to smooth it in order to give it an attractive appearance, for at least some will remain visible; silicone adhesive is easy to shape.

On the other hand, this assembly process, which consists in gluing the glass-ceramic plate onto the metal structure using a silicone adhesive, has various disadvantages. First of all, it requires a relatively large quantity of silicone adhesive; the high cost of this product is a first disadvantage. Indeed, it appears that during assembly the quantity of silicone necessary to fill the entire space between the plate and the frame is large; additionally, some of the silicone used is useless or removed. The silicone can be useless when it unintentionally overflows the adhesive area and is removed, particularly during smoothing. Another disadvantage is linked to the polymerization time, which increases with the quantity of material and which also leads to an increase in manufacturing costs, particularly due to the necessity of providing intermediate storage for the plates.

Additionally, another disadvantage particularly linked to this long polymerization time involves the assembly itself The glass-ceramic plates are usually delivered as-is to the range manufacturers who are responsible for the assembly. In theory, this type of factory assembly, where the workers have the necessary tools, does not present any problems. On the other hand, this type of assembly seems much more difficult for a tradesman who must remount a glass-ceramic plate onto a metal structure after making electrical repairs or in order to replace a glass-ceramic plate that has been damaged. It seems to be a difficult task for the tradesman to attach the glass-ceramic plate, for he must place the silicone adhesive on the periphery of said plate, on the internal surface and on the edges, smooth the adhesive in any visible areas, and keep the glass-ceramic plate well-centered while applying pressure during all these operations and during the polymerization time for the adhesive, which is relatively long.

Furthermore, removing this type of glass-ceramic plate previously attached to a metal structure using silicone adhesive is not easy either, particularly for a tradesman. The tradesman must make a cut in the silicone adhesive underneath, i.e., on the internal face of the glass-ceramic plate, and a cut on top, i.e., on the edge of said plate. These two operations, which must be done along the entire periphery, are not simple, for the two cutting lines must meet in order to separate the two elements—glass-ceramic plate and metal structure—successfully. Furthermore, and more particularly when cutting on the internal face of the glass-ceramic plate, it is not easy to make this cut without scratching the internal face of the plate. A scratch can lead to a crack during stress and therefore to a break in the plate. It therefore appears virtually impossible to remove a glass-ceramic plate in order to reinstall it later without damaging the plate. Furthermore, in order to reattach it to the structure, it is necessary to eliminate the traces of silicone adhesive from the previous assembly to the greatest extent possible, which also creates a risk of scratching, particularly on the bottom face of the glass-ceramic plate, thereby making this plate more fragile.

As a consequence, in order to replace or remove a glass-ceramic plate it is now customary to work on the entire plate-metal structure unit, that is, it is first necessary to remove the range top, which is usually built into a cooking surface, then to remove the plate connected to a part of the metal structure from the rest of the metal structure. In no case is it possible at present to consider completely separating the plate from the metal structure onto which it is glued.

SUMMARY OF THE INVENTION

The aim of the invention is to eliminate these disadvantages and more specifically to propose a plate made of glass material such as tempered glass or glass-ceramic for which mounting onto a metal or equivalent structure is less costly than the techniques cited previously, particularly with regard to the adhesive material, and which can be removed and replaced, if necessary, simply and without any danger of damaging the glass-ceramic plate.

The invention also targets this type of plate made of glass material whose the mounting means will ensure tightness, mechanical impact absorption and temperature resistance, and will give the unit an attractive appearance.

These goals are achieved in accordance with the invention by a plate made of glass material such as tempered glass or glass-ceramic designed to be mounted in a frame, a metal frame, for example, comprising at least one polymer strip on its periphery, said strip having on at least one portion of its length a shape that allows the plate to nest with the frame and thereby be fixed inside it.

By periphery is meant the peripheral area of the plate of glass material; that is, the strip can cover at least part of the edge of the plate and/or at least a peripheral part of one surface of said plate.

In accordance with the invention, mounting is achieved by a strip with a section sized so that it has the necessary and sufficient quantity of material to perform its function Furthermore, since mounting is accomplished by nesting, it is simple to do and can be reversed. Preferably, nesting is accomplished by choosing a polymer strip that can be elastically deformed.

One mode of embodiment of the invention provides that the shape present on the strip is hollow and that it joins with a complementary raised section provided in the frame.

According to another preferred mode of embodiment of the invention, the shape on the strip protrudes, and it fits into a complementary elongated slot or hollow shape in the frame. According to either of these modes of embodiment, the plate of glass material is mounted in the frame simply by mechanical pressing. Effectively, the elastic deformation of the strip and therefore of the protrusion, if such exists, makes it possible by pressing to insert the plate into the frame by deforming the strip, which returns to its initial shape once the protrusion reaches the housing designed for this purpose in the frame. Advantageously, the dimensions and the shape of the strip are such that once the plate is inserted into the frame, this frame exerts pressure on the strip on the periphery of the plate. This type of joining therefore makes it possible to ensure good tightness between the plate of glass material itself and the frame.

To accomplish this, in accordance with a variation of the invention, the polymer strip is, for example, placed along the entire edge of the plate and optionally on a portion of the lower face, so that the strip performs both the mounting and tightness functions.

In accordance with other variations of the invention, the plate comprises at least two strips, one covering all or part of the edge of the plate and ensuring tightness, the other covering another part of the edge and/or a portion of the lower face of the plate and making it possible to mount the plate.

These embodiment variations separate the mounting and tightness functions, each being performed by a different strip. These types of embodiments can make it possible to limit further the quantity of material needed to produce these strips. Furthermore, they can make it possible to produce strips using different materials, with basically different shapes, for example one might be continuous, the other discontinuous, or even to produce strips using different techniques.

In accordance with a preferred mode of embodiment of the invention, the strip comprises the shape over its entire length, and this shape fits into a complementary shape provided along the entire periphery of the frame. This type of embodiment provides a particularly secure mounting. However, the dimensions of the shape are advantageously designed for easy removal of the plate. For example, this can be done using suction cups positioned on at least one corner of the plate.

The material making up the strip must be a material with sufficient temperature resistance, i.e., stable to approximately 200° C. Advantageously, after polymerization, the material has elastic properties. It is also preferably inert with respect to foods and stable with regard to detergents or other cleaning materials that might be used in a kitchen in particular.

In accordance with an advantageous variation of the invention, the strip is a silicone such as those marketed by RHONE POULENC under the names RTV 585, RTV 1525, or one of the silicones marketed by WACKER under the name ELASTOSIL LR 3004/50.

In accordance with other variations, the strip may be produced using fluorinated elastomers like the one marketed by the SAFIC-ALCAN Corporation under the name VITON or the one marketed by the 3 M Corporation under the name FLUOREL. While these materials meet the use requirements, they are less attractive from a financial standpoint.

The invention therefore makes it possible, primarily compared to known techniques, to limit the quantity of silicone used, the strip being fully produced prior to mounting and therefore with the necessary and adequate dimensions.

Additionally, there are numerous techniques for using these materials to produce a strip.

In accordance with an initial variant of the invention, the strip is produced by duplicate molding and more specifically by injection molding. Particularly in the case of a strip made of silicone, there are various techniques for producing said strip, particularly depending on the choice of silicone. These techniques most often consist in hot-curing the silicone to transform it within a short period from a paste-like state to a solid state that is relatively elastic. A first method more particularly suited to silicones with high viscosity consists of very high pressure injection of the EPDM (ethylene-propylene-diene) type. This technique consists in injecting silicone into a mold kept at 200° C. with very high pressures. This technique requires many precautions in order to prevent the plates of glass material from breaking due to the high pressures.

Another technique suited to bi-component paste-like silicones whose viscosity is between 200,000 and 2,000,000 mPa.s is high pressure thermoplastic injection into a mold heated to 200° C. The pressures used are thus less dangerous for the plates of glass material.

A final technique more suited to silicones whose viscosity is closer to liquids is low pressure high frequency injection. Unlike the previous techniques, the mold is refrigerated, and the material is heated under the influence of the high frequency electrical field. In the case of silicones, additives such as FREQUON additives are added to improve the sensitivity of the high frequency field. This last technique has the advantage of being very fast.

According to another variant of the invention, the polymer is produced by extrusion in situ. This type of technique is described, for example, in patent EP 0 524 092 for other applications involving automobiles. This technique can be used more particularly with silicones.

According to a final variant of the invention, the strip is extruded beforehand and attached to the plate of glass material by clipping or gluing. This last variant offers advantages for recycling of the materials: separating the strip and the plate appears to be very simple, particularly in tie case of clipping.

The various methods described for producing the strip in accordance with the invention allow one to obtain a strip with the desired shape that can perform the mounting and tightness functions without any surplus of material.

It is therefore possible to prepare plates of glass material, such as glass-ceramic plates combined with a strip, ready to be mounted into a frame.

The subsequent assembly step can therefore be simplified as compared to the previous techniques, and can be very fast, since no wait time is necessary.

BRIEF DESCRIPTION OF THE DRAWINGS

Other details and features of the invention will become clear from the description of the examples of embodiment given in reference to FIGS. 1, 2 and 3, which show.

DETAILED DESCRIPTION OF THE PREFERRED EMBODIMENTS

The FIGS. are not drawn to scale in order to make them easier to understand.

Figure 1A:
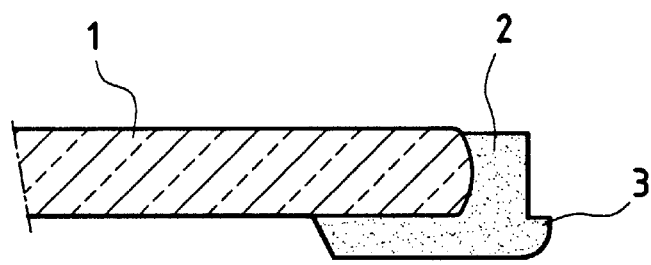
FIGS. 1a, b, c: an example of a glass-ceramic plate comprising a strip in accordance with the invention and its mounting in a frame.

FIG. 1 is a partial side view of a glass-ceramic plate (1) on the periphery of which a polymer joint (2) was duplicate-molded This type of joint (2) is produced, for example, by HF encapsulation of a silicone such as the one marketed under the name RTV 585 by the RHONE POULENC Corporation.

Figure 2:
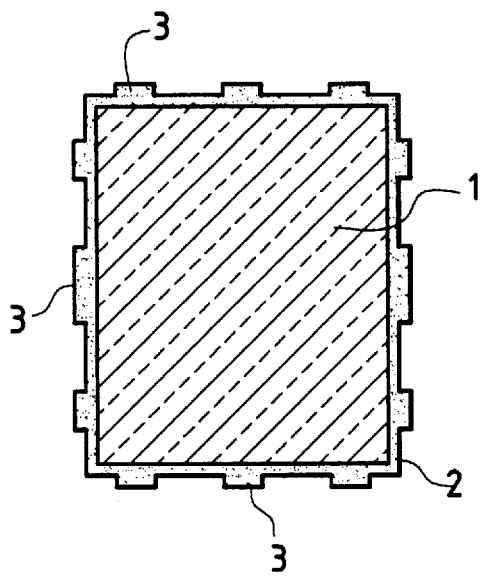
FIG. 2: a top view of a plate in accordance with FIG. 1.

The joint (2), as shown more clearly in FIG. 2, is molded along the entire periphery, particularly to guarantee good tightness, a function to which we will return subsequently. At its base, the strip (2) comprises a protuberance or snug (3) that will be of assistance in mounting. The snug (3) can be molded either continuously along the entire periphery of the pane, or discontinuously, as shown in FIG. 2.

Figure 1B:
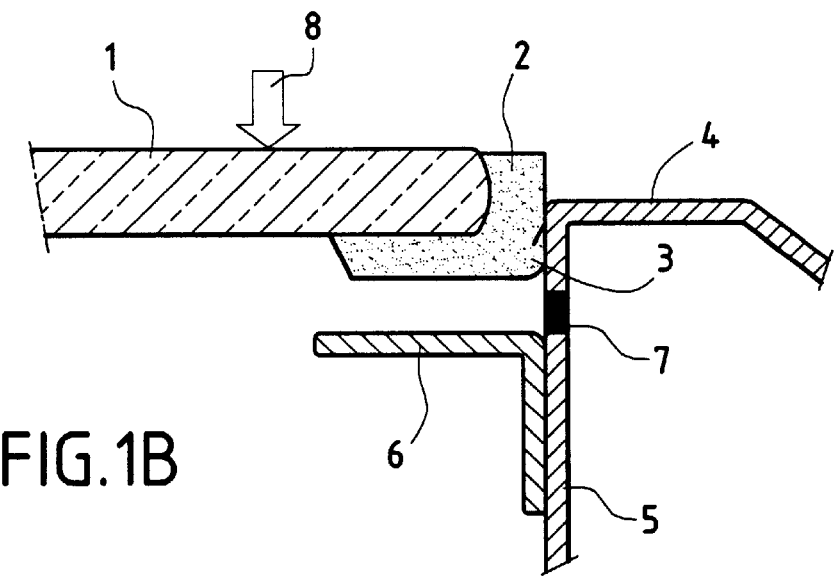
Figure 1C:
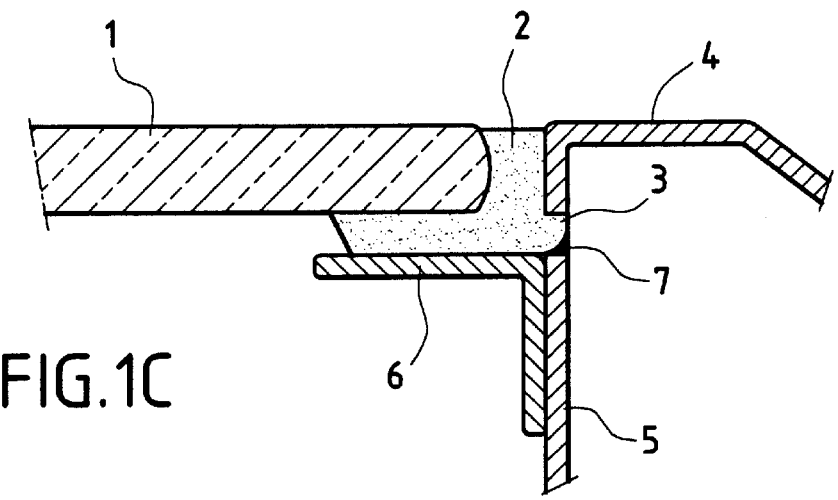

FIGS. 1b and 1c show more precisely the assembly or mounting of the glass-ceramic plate-strip unit in a frame (4). The frame (4), which is most often of metal, consists of several parts: it comprises at least one part forming roughly vertical members (5), which make up the opening of the frame(4) into which the glass-ceramic plate-strip unit is inserted. Preferably, after insertion of said unit, the contact between the strip (2) and the members (5) must be completely leak-proof in order to prevent any water from entering the area where the heating elements are placed. The tightness obtained also makes it possible to prevent this area from being coated with dust or food particles. The frame (4) then comprises a second part that also extends along the entire periphery of the frame; these are horizontally positioned bearing members (6) that support the plate-strip unit, the contact with the members (6) being produced advantageously through the intermediary of the strip.

In accordance with the invention, the vertical members (5) are additionally equipped with a slot or opening (7) into which the snug (3) can be inserted. In the case of a continuous snug (3) over the entire periphery of the plate, his will, of course, no longer be a slot, but rather a cavity whose hollow volume is at least complementary to that of the snug (3).

Figure 3:
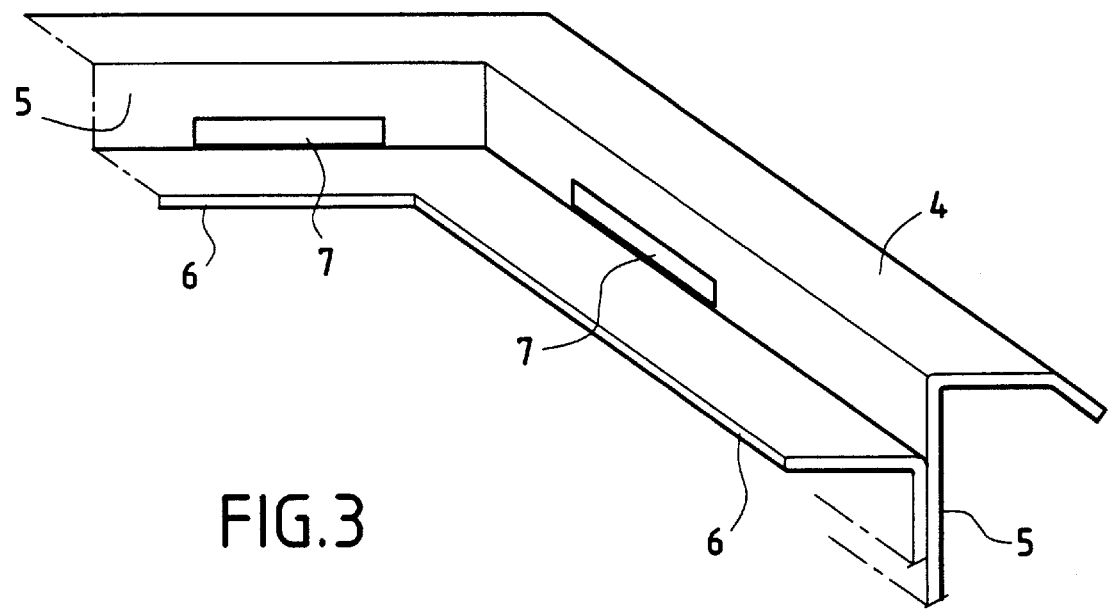
FIG. 3: a view in perspective of a frame joining with the plates in accordance with FIGS. 1 and 2, FIGS. 4a, b: another example of embodiment of the invention, FIGS. 5a, b: another example of embodiment of the invention.

FIG. 3 partially illustrates this type of frame (4) by a perspective view. The frame (4) shown here is designed to receive a strip comprising snugs (3) distributed along the periphery of the glass-ceramic plate in discontinuous fashion. It appears that the frame (4) represented here comprises several slots or openings (7) distributed over the vertical members (S). These types of openings are, moreover, very simple to produce, particularly by stamping.

FIG. 1b shows that the choice of material making up the strip, in is case a silicone like the one described previously, is made so that said strip can be deformed elastically. In fact, in addition to the snug (3), the dimensions of the "frame" formed by the strip (2) along the periphery of the glass-ceramic plate exceed those of the orifice of the frame (4) into which the glass-ceramic plate-strip unit is to be inserted. Thus, as illustrated in FIG. 1b, pressure, symbolized by the arrow (8) must be exerted on the glass-ceramic plate-strip unit in order to insert it into the frame (4) to deform the strip (2) and more particularly the snug (3). Moreover, after being mounted in the frame (4), this elastic deformation of the strip reveals an interaction between the strip (2) and the vertical member (5) of the frame; this creates friction that contributes to keeping the glass-ceramic plate (1) in the frame (4) and also ensures good tightness of the bond.

FIG. 1c shows the glass-ceramic plate-strip unit installed in the frame (4). In this FIG. 1c, the glass-ceramic plate-strip unit has been inserted into the frame (4) so that part of the strip rests against the bearing members (6) and is in contact with the vertical members (5), and that the snug (3) goes into the opening (7). To reach this position, the strip was deformed, as shown in FIG. 1b, and has almost completely returned to its initial shape; only the portion of the strip above the area in which the lug is located remains compressed, as explained previously, more particularly to obtain perfect tightness. Additionally, positioning the snug (3) in the opening (7) provided for this purpose guarantees that the glass-ceramic plate will stay inside the frame (4). This holding effect is further reinforced by the friction forces at work between the members (5) and the strip (2).

The mounting of a glass-ceramic plate (1) in a frame (4) is therefore completely assured in accordance with the invention Additionally, it is nevertheless possible to remove said plate again without much difficulty. In fact, tests have shown that with one or more suction cups, it was possible to exert sufficient traction to deform the strip and remove the snug or snugs (3) from the openings (7).

It is still possible to make a few improvements to the strip (2) joined to the glass-ceramic plate (1). After inserting the glass-ceramic plate-strip unit into the frame, it was explained that the strip undergoes compression by the vertical members (5); so it is possible to see a deformation in the upper part of the strip (2), more particularly a swelling. In the assembly shown in FIG. 1c, this part of the strip that surrounds the glass-ceramic plate (1) remains visible. It is therefore desirable to have a visible surface of the strip that remains flat and does not have any defects. The invention therefore proposes that the strip be formed beforehand with an upper portion that compensates for the swelling due to the compression exerted by the members (5), so that the upper surface of the strip (2) is flat after assembly.

Another variant of the invention that is not shown in the FIGS. consists in forming a snug (3) on the strip (2) whose shape and dimensions make it suitable for performing functions other than mounting. For example, this type of snug (3) might help center the glass-ceramic plate during installation or even when it is in place in the frame.

Figure 4A:
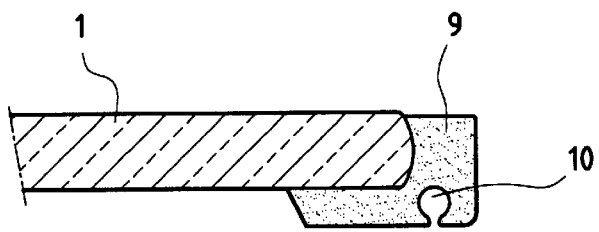
Figure 4B:
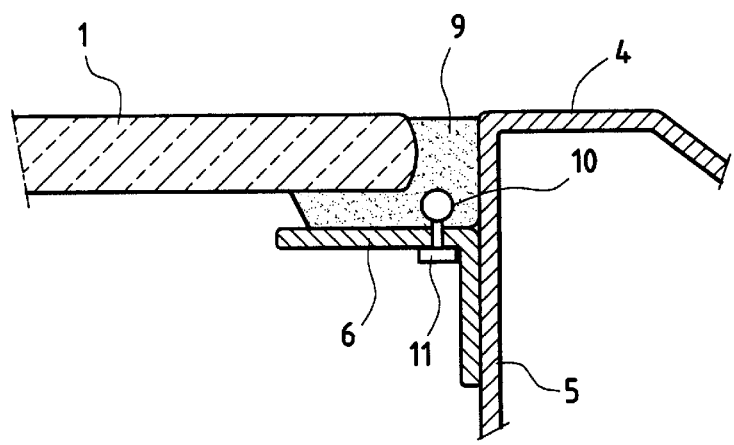

FIGS. 4a and 4b show another variant of the invention. In FIG. 4a, a glass-ceramic plate is combined with a peripheral strip (9) made of silicone according to the same techniques as the one shown in FIGS. 1 and 2. On the other hand, unlike the preceding FIGS., the shape tat fixes the plate to the frame is not a protrusion, but a hollow shape (10) placed on the lower face of the strip (9). The positioning of this shape must not, of course, be interpreted in restrictive fashion.

FIG. 4b shows that on the frame (4) and more particularly on the bearing member (6) an attachment head (11) is provided, whose shape is complementary to that of the shape (10). This type of representation of the invention allows yet another simple and reliable form of mounting a glass-ceramic plate (1) in a frame (4) —while allowing for potential removal.

Figure 5A:
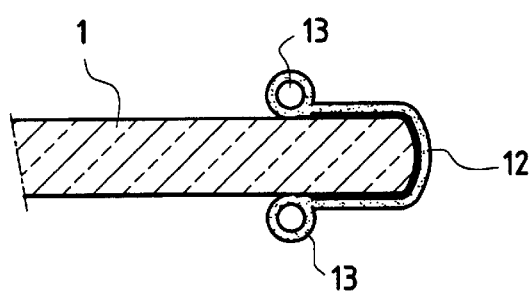
Figure 5B:
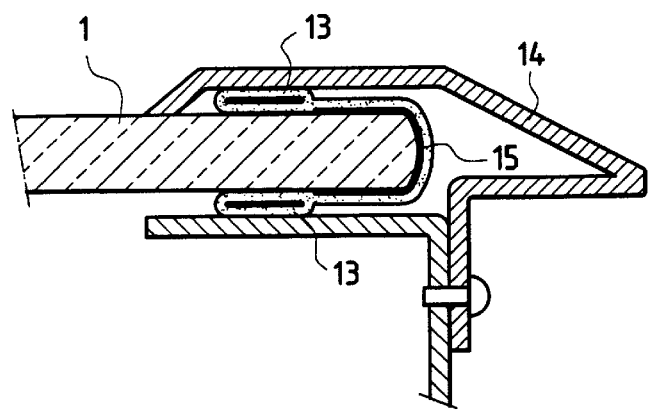

FIGS. 5a and 5b illustrate a completely different type of strip (12): this strip (12) is a strip produced beforehand by extrusion, for example. In this case, it envelopes a core (15) such as a metal clip or any other stiff material that makes it possible to attach it to the glass-ceramic plate by squeezing. In the case shown, the strip is not visible after assembly, but will be covered by part of the frame (14). The strip comprises protuberances (13) that are visible in FIG. 5a, which, during assembly, as shown in FIG. 5b, are deformed in order to fix the glass-ceramic plate (1) in the frame (14) and to guarantee good tightness. It appears that assembly and disassembly are not as easy as in the preceding cases, for the frame (14) covers the strip for aesthetic reasons. On the other hand, as cited previously, this type of pre-extruded strip has a great advantage with regard to the recycling of the glass-ceramic plates, since it can be separated from said plate easily.

The various examples given above, which of course must not be interpreted in restrictive fashion, show that the invention allows simple and effective mounting of a glass-ceramic plate in a frame at a lower cost, more particularly with regard to the polymer material.

In fact, joining a strip to the plate prior to mounting the plate in the frame, said strip being produced in accordance with one of the methods described previously, makes it possible to size this strip so that it performs it mounting functions and tightness functions, if any, without additional cost due to any excess of material. Additionally, the invention allows simplified assembly, particularly without any need for intermediate storage during polymerization of the strip, which is easy to accomplish, but which still allows disassembly through the choice of a suitable shape.

What is claimed is:

1. A plate of glass material, adapted to be mounted in a frame, comprising:

a glass material plate; and a polymer strip on the periphery of the glass material plate, the polymer strip being shaped to mechanically cooperate with the frame without any adhering to said frame.

2. The plate of claim 1, wherein said strip is formed of an elastic material.

3. The plate of claim 2, wherein the strip has a protrusion which is to nest in a complementary shape of the frame.

4. A plate of glass material, adapted to be mounted in a frame, comprising:

a glass material plate; and a polymer strip on the periphery of the glass material plate, the polymer strip having a recess to mechanically cooperate with a protrusion on the frame.

5. The plate of claim 1, wherein the strip extends around the periphery of the glass material plate and has a shape which is complementary to the shape of the frame.

6. A plate of glass material, adapted to be mounted in a frame, comprising:

a glass material plate; and a polymer strip on the periphery of the glass material plate, the polymer strip being shaped to mechanically cooperate with the frame, wherein the strip is discontinuous on a part thereof which is to mechanically cooperate with the frame.

7. The plate of claim 1, wherein the strip is made of a silicone.

8. The plate of claim 1, wherein the strip is overmolded.

9. The plate of claim 1, wherein the strip is in-situ extruded.

10. The plate of claim 1, wherein the strip is an extruded strip and is clipped to said glass plate.

11. The plate of claim 1, wherein the strip is an extruded strip and is adhesively bonded to said glass plate.

12. A plate of glass material, adapted to be mounted in a frame, comprising:

a glass material plate; and a polymer strip on the periphery of the glass material plate, wherein the polymer strip comprises protuberances which are to be deformed by the frame when the polymer strip mechanically cooperates with the frame.

13. A plate of glass material mounted in a frame of a range, comprising:

a frame of a range;

a glass material plate; and a polymer strip mounted on the periphery of the glass material plate, the polymer strip and the frame being shaped to mechanically cooperate with one another so as to secure the glass material plate to the frame, wherein said polymer strip is not adhered to said frame.

* * * * *